US012583132B2

(12) United States Patent
Raj

(10) Patent No.: US 12,583,132 B2
(45) Date of Patent: Mar. 24, 2026

(54) ROBOTIC ARM

(71) Applicant: Shrey Krishan Raj, Dublin, CA (US)

(72) Inventor: Shrey Krishan Raj, Dublin, CA (US)

( * ) Notice: Subject to any disclaimer, the term of this patent is extended or adjusted under 35 U.S.C. 154(b) by 1074 days.

(21) Appl. No.: 17/580,678

(22) Filed: Jan. 21, 2022

(65) Prior Publication Data

US 2023/0234244 A1 Jul. 27, 2023

(51) Int. Cl.
B25J 15/06 (2006.01)
B25J 15/00 (2006.01)

(52) U.S. Cl.
CPC ....... B25J 15/0616 (2013.01); B25J 15/0052 (2013.01)

(58) Field of Classification Search
CPC ... B25J 15/0616; B25J 15/0052; B25J 15/106
See application file for complete search history.

(56) References Cited

U.S. PATENT DOCUMENTS

| | | | | |
|---|---|---|---|---|
| 7,409,812 | B2 * | 8/2008 | Gilmore | B65G 57/04 |
| | | | | 53/473 |
| 8,910,985 | B2 * | 12/2014 | Neeper | B25J 15/0028 |
| | | | | 294/902 |
| 10,710,247 | B2 * | 7/2020 | Kirkwood | B25J 19/0058 |
| 11,504,862 | B1 * | 11/2022 | Wieckowski | B25J 9/144 |
| 11,999,054 | B2 * | 6/2024 | Schmitt | B25J 15/08 |

| | | | | |
|---|---|---|---|---|
| 2009/0314112 | A1 * | 12/2009 | Melville | B25J 15/106 |
| | | | | 74/144 |
| 2013/0034420 | A1 * | 2/2013 | Hjornet | B25J 15/0616 |
| | | | | 414/752.1 |
| 2019/0308331 | A1 | 10/2019 | Hurwit et al. | |
| 2019/0308822 | A1 * | 10/2019 | Struijk | A01G 22/35 |

FOREIGN PATENT DOCUMENTS

| | | |
|---|---|---|
| WO | 2006082100 A1 | 8/2006 |
| WO | 2021094262 A1 | 5/2021 |

OTHER PUBLICATIONS

Ball-shaped gripper adapts to objects with different shapes, Sep. 5, 2014.

* cited by examiner

*Primary Examiner* — Stephen A Vu

(57) ABSTRACT

A robotic arm is provided. The robotic arm includes a gripper. The gripper includes an elongated body; a semi-circular body includes a flat surface and a curved surface; a suction unit of a pre-defined shape operatively coupled to a center portion of the curved surface of the semi-circular body; an array of pins arranged around the suction unit, wherein each of the array of pins comprises a pin body and a pin head, wherein the head rests along the flat surface of the semi-circular body, wherein the pin body is extended along the curved surface of the semi-circular body. The array of pins is configured to take a shape of a target object to provide support for the target object during an operation of the robotic arm. The suction unit is configured to hold the target object in an inward direction during the operation of the robotic arm.

6 Claims, 3 Drawing Sheets

ROBOTIC ARM

FIELD OF INVENTION

Embodiments of a present disclosure relate to a robotic arm, and more particularly, to a robotic arm which can adapt to a shape of an object.

BACKGROUND

A robotic arm is a type of mechanical arm, usually programmable, with similar functions to a human arm; the arm may be the sum of the mechanism or may be part of a more complex robot. In order to enable the functioning of the robotic arm, different types of grippers are used to help in gripping of objects while picking and placing the objects from one location to another. In particular, pneumatically driven gripper devices are used in a conventional approach for handling objects. In such conventional approach, the robotic arms or hands provide mechanism for either targeted precise picking or coarse box picking. However, the conventional approach does provide a flexible hand for picking uneven and heavy object.

Hence, there is a need for an improved robotic arm to address the above-mentioned issues.

BRIEF DESCRIPTION

In accordance with one embodiment of the disclosure, a robotic arm is provided. The robotic arm includes a gripper. The gripper includes an elongated body. The gripper also includes a semi-circular body includes a flat surface and a curved surface. The gripper also includes a suction unit of a pre-defined shape operatively coupled to a center portion of the curved surface of the semi-circular body. The gripper also includes an array of pins arranged around the suction unit, wherein each of the array of pins comprises a pin body and a pin head, wherein the head rests along the flat surface of the semi-circular body, wherein the pin body is extended along the curved surface of the semi-circular body. Each of the array of pins is configured to adapt in a pre-set direction to take a shape of at least one target object to provide support for the at least one target object during an operation of the robotic arm. The suction unit is configured to hold the at least one target object in an inward direction during the operation of the robotic arm.

To further clarify the advantages and features of the present disclosure, a more particular description of the disclosure will follow by reference to specific embodiments thereof, which are illustrated in the appended figures. These figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a robotic arm. As used herein, robotic arm is a type of mechanical arm, usually programmable, with similar functions to a human arm; the arm may be the sum of the mechanism or may be part of a more complex robot. In one embodiment, the robotic arm may be configured to pick and place objects from one location to another.

Figure 1:
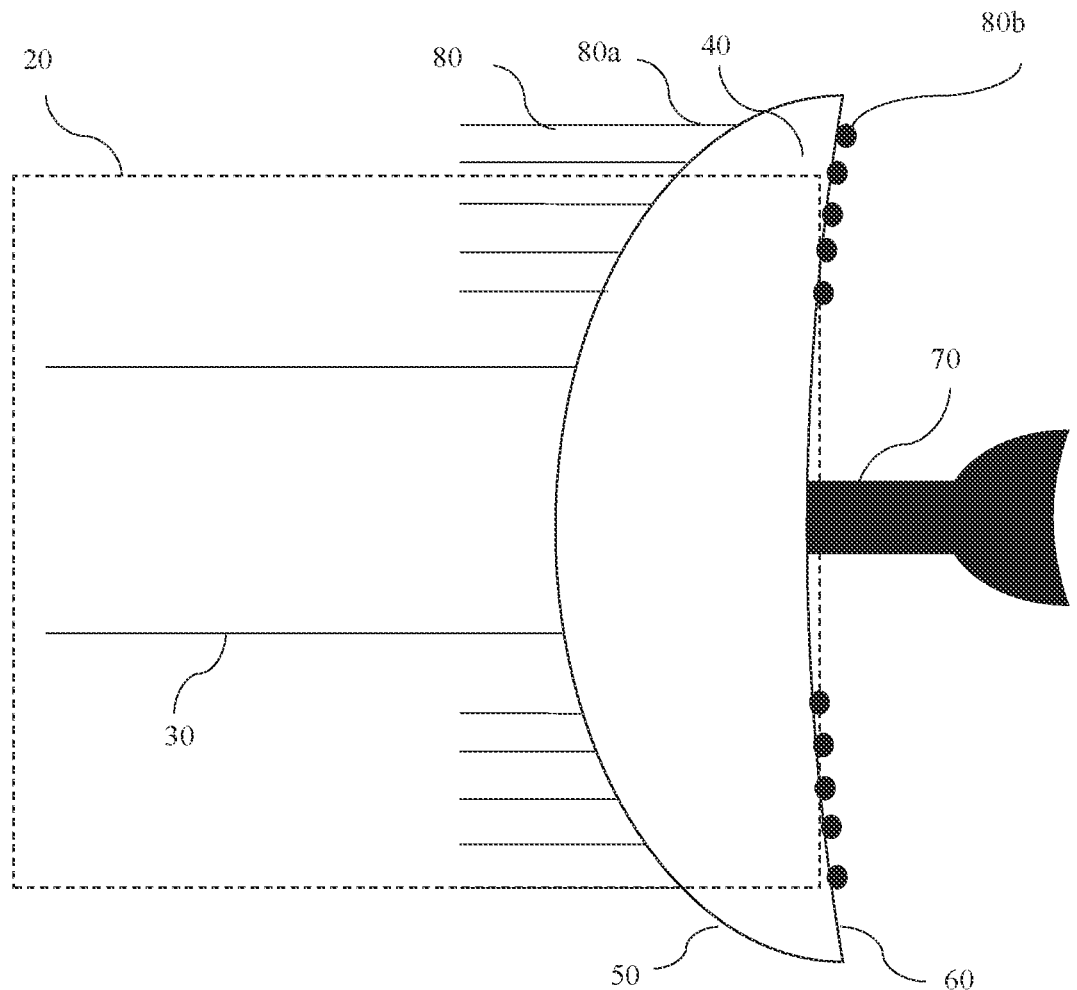
FIG. 1 is a schematic representation of a robotic arm in accordance with an embodiment of the present disclosure.

FIG. 1 is a schematic representation of a robotic arm 10 in accordance with an embodiment of the present disclosure. The robotic arm 10 includes a gripper 20. The gripper 20 includes an elongated body 30.

The gripper 20 also includes a semi-circular body 40, wherein the semi-circular body 40 includes a first surface 50 and a second surface 60. As used herein, the term 'gripper' is defined as an object that grips things or makes it easier to grip things. In one embodiment, the first surface 50 corresponds to one of a flat surface or a curved surface. In another embodiment, the second surface 60 corresponds to one of a curved surface or a bulged surface.

The gripper 20 also includes a suction unit 70 of a pre-defined shape operatively coupled to a center portion of the second surface 60 of the semi-circular body 40. As used herein, the term 'suction' is defined as a production of a partial vacuum by the removal of air in order to force fluid into a vacant space or procure adhesion. In one exemplary embodiment, the pre-defined shape of the suction unit 70 may correspond to a shape of one of a cup or a tong.

Furthermore, the gripper 20 includes an array of pins 80 arranged around the suction unit 70, wherein each of the array of pins 80 comprises a pin body 80*a* and a pin head 80*b*. The pin head 80*a* rests along the first surface 50 of the semi-circular body 40. The pin body 80*a* is extended along the second surface 60 of the semi-circular body 40. In one embodiment, each of the array of pins 80 may take a shape of a needle or a thumb pin.

Each of the array of pins 80 is configured to adapt in a pre-set direction to take a shape of at least one target object to provide support for the at least one target object during an operation of the robotic arm 10. In one embodiment, the array of pins 80 may adapt to the shape of the target object by mechanical pressure experienced by a surface of the target object. In one exemplary embodiment, the adaption of each of the array of the pins 80 may include one of extension or depression based on a shape of the at least one target object. In operation, the array of pins 80 is pushed towards to the target object. Consequently, due to the mechanical force exerted by the surface of the target object, each of the array of pins 80 adjusts itself to the exterior shape of the target object in the pre-set direction at which the gripper 20 holds and pics the target object to place the same from one location to another. In one exemplary embodiment, the pre-set direction may include one of a horizontal, a vertical direction, or a circular direction. In one embodiment, one or more of the array of pins 80 that do not get extended provide support to the target object.

Further, the suction unit 70 is configured to hold the at least one target object in an inward direction during the operation of the robotic arm 10. In operation, once the array of pins 80 take the shape of the target object, the suction unit 70 creates the suction between the target object and the suction unit 70. The suction is usually formed at an exterior end of the suction unit 70 which may be pointing towards the target object. In one exemplary embodiment, the operation of the robotic arm 10 may include at least one of picking, placing, moving, or a combination thereof, of the at least one target object.

In one exemplary embodiment, the gripper 20 may further include a locking mechanism operatively coupled to the array of pins 80. The locking mechanism may be configured to enable each of the array of pins 80 to lock the at least one target object during the operation of the robotic arm 10.

Figure 2A:
FIGS. 2a-2d are schematic representation of a process of picking a target object by the robotic arm of FIG. 1 in accordance with an embodiment of the present disclosure.
Figure 2A:
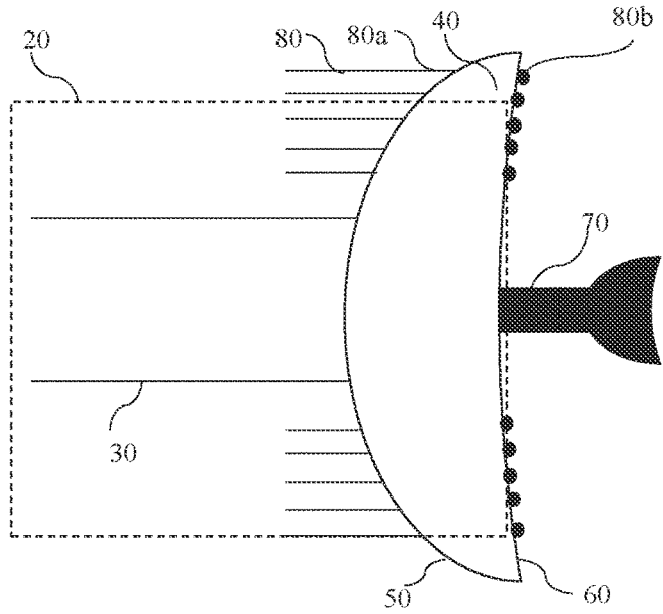

In operation, turning to FIGS. 2*a*-2*d*, FIGS. 2*a*-2*d* are schematic representation of a process of picking a target object by the robotic arm of FIG. 1 in accordance with an embodiment of the present disclosure. FIG. 2*a* shows the gripper 20 and hence the robotic arm 10 are in a resting mode where each of the array of pins 80 are in a retracted position.

Figure 2B:
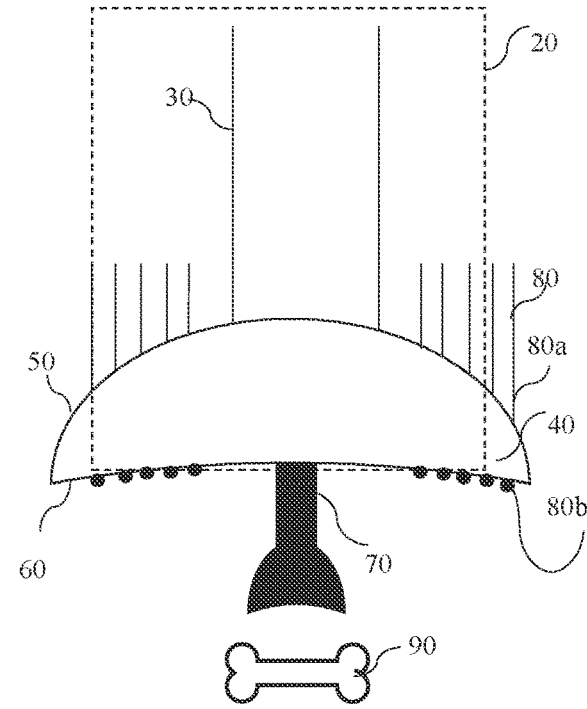

FIG. 2*b* represents a state where the robotic arm 10 is getting ready to pick the target object 90. In one exemplary embodiment, the robotic arm 10 may include one or more processors which may initiate the process of picking up the target object 90 from one location to another upon receiving one or more instructions from a source. In such embodiment, the one or more instructions may be pre-defined or may be set in real time.

In one specific embodiment, the gripper 20 may further include one or more sensors such as but not limited to, a position sensor, proximity sensor, or the like, which may be configured to detect and identify a position of the target object from the semi-circular body 40 of the gripper 20.

Figure 2C:
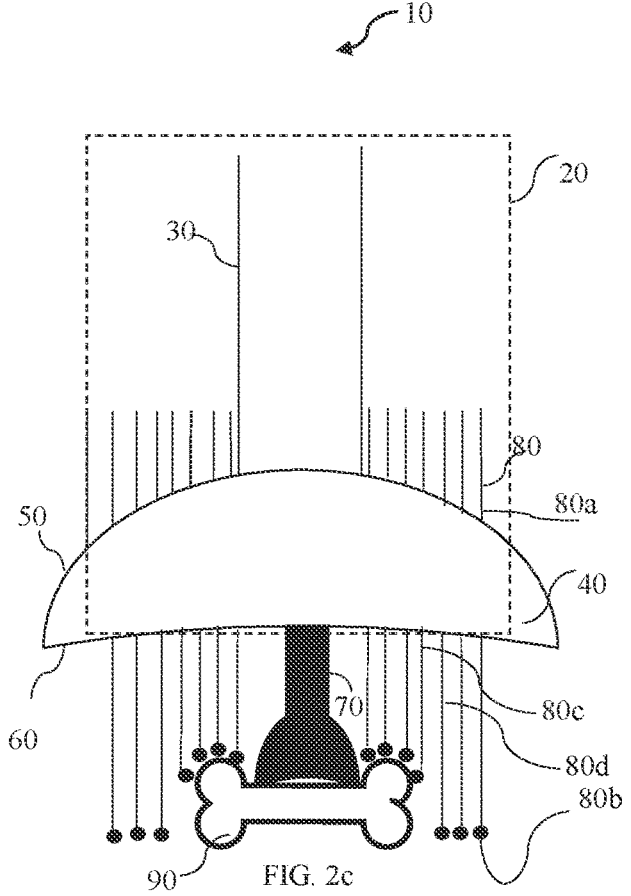

Furthermore, FIG. 2*c* represents a stage where the suction unit 70 pulls the target object 90 towards the suction unit 70 and some of the array of pins 80 get depressed and the some more of the array of pins 80 remain extended. The depressed pins 80*c* and extended pins 80*d* provide support and stability to the picked target object 90.

Figure 2D:
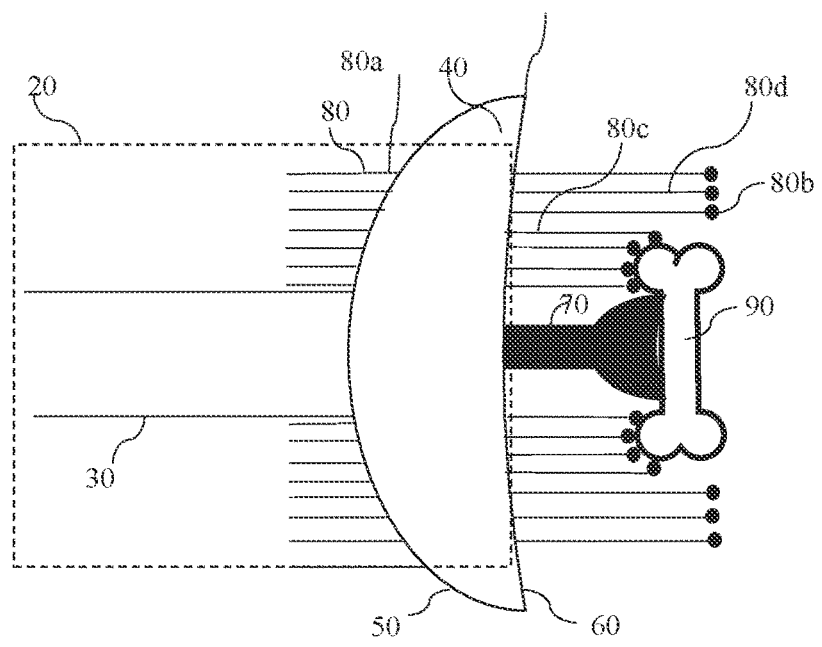

Further, the FIG. 2*d* represents a side cross-sectional view of the robotic hand 10 when the target object 90 is picked up.

Various embodiments of the present disclosure enable the robotic arm to provide a flexible hand for picking uneven and heavy object. Since the pins or needles can adapt to any shape, the robotic arm is not limited to operate any specific kind of object thereby making the system more reliable and efficient.

The system combines the power of suction cup along with 3D needles to take the shape of the object being lifted and moved. The needles will acquire the shape of the lifted object and provide support. The needles will have locking mechanism that will ensure that needles lock when the object is lifted and unlock when the object is put away, thereby making the transmission of the object easy.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A robotic arm comprising a gripper, the gripper comprising:

an elongated body;

a semi-circular body comprising a first surface and a second surface;

a suction unit of a pre-defined shape operatively coupled to a center portion of a curved surface of the semi-circular body;

an array of at least ten pins arranged radially around the suction unit, wherein each of the array of pins comprises a pin body and a pin head, wherein the pin head rests along the first surface of the semi-circular body, wherein the pin body is extended along the curved surface of the semi-circular body;

wherein each pin of the array is independently movable such that the array of pins is configured to adapt in a pre-set direction to take a shape of at least one target object to provide support for the at least one target object during an operation of the robotic arm; and wherein the suction unit is configured to hold at least one target object in an inward direction during the operation of the robotic arm.

2. The robotic arm of claim 1, wherein the first surface corresponds to one of a flat surface or a curved surface, wherein the second surface corresponds to one of a curved surface or a bulged surface.

3. The robotic arm of claim 1, wherein the pre-defined shape of the suction unit comprises a shape of one of a cup or a tong.

4. The robotic arm of claim 1, wherein the pre-set direction comprises one of a horizontal, a vertical direction, or a circular direction.

5. The robotic arm of claim 1, wherein the adaptation of each of the array of the pins comprises one of extension or depression based on a shape of the at least one target object.

6. The robotic arm of claim 1, comprising a locking mechanism operatively coupled to the array of pins, and configured to enable each of the array of pins to lock with the at least one target object during the operation of the robotic arm.

\* \* \* \* \*